US007350339B2

(12) United States Patent
Yakushigawa et al.

(10) Patent No.: US 7,350,339 B2
(45) Date of Patent: Apr. 1, 2008

(54) MIXING SYSTEM

(75) Inventors: Yasushi Yakushigawa, Shiga (JP); Adrian Meredith Sunter, Worcestershire (GB)

(73) Assignee: Ishida Co., Ltd., Kyoto (JP)

( * ) Notice: Subject to any disclaimer, the term of this patent is extended or adjusted under 35 U.S.C. 154(b) by 784 days.

(21) Appl. No.: 10/652,952

(22) Filed: Aug. 28, 2003

(65) Prior Publication Data

US 2004/0043122 A1  Mar. 4, 2004
US 2007/0269565 A9  Nov. 22, 2007

Related U.S. Application Data

(63) Continuation of application No. PCT/GB02/02002, filed on May 1, 2002.

(30) Foreign Application Priority Data

May 8, 2001    (JP)    ............................. 2001-137010

(51) Int. Cl.
    *B65B 9/06*    (2006.01)
(52) U.S. Cl. .......................... 53/551; 53/502
(58) Field of Classification Search ............... 53/52, 53/53, 502, 503, 545, 550, 551, 239; 426/289, 426/295
    See application file for complete search history.

(56) References Cited

U.S. PATENT DOCUMENTS

| 3,559,960 A | * | 2/1971 | Elder et al. ................. 366/187 |
| 4,128,985 A | * | 12/1978 | Simmons ..................... 53/502 |
| 4,137,689 A | * | 2/1979 | McClusky et al. ............ 53/502 |
| 4,779,402 A | * | 10/1988 | Duynhoven et al. .......... 53/502 |
| 4,813,205 A | * | 3/1989 | Mikata et al. ................ 53/502 |
| 5,331,792 A | * | 7/1994 | Kitchen ....................... 53/502 |
| 5,514,399 A | * | 5/1996 | Cordera et al. ............. 426/295 |
| 5,520,942 A | * | 5/1996 | Sauer et al. ................ 426/289 |
| 5,698,252 A | * | 12/1997 | Kelly et al. ................. 426/295 |
| 5,721,000 A |   | 2/1998 | Center et al. ............... 426/289 |
| 5,728,216 A |   | 3/1998 | London ....................... 118/13 |
| 5,881,532 A | * | 3/1999 | Kitagawa ...................... 53/54 |
| 6,285,918 B1 | * | 9/2001 | Kono .......................... 53/502 |

FOREIGN PATENT DOCUMENTS

JP              7-8154          1/1995

* cited by examiner

*Primary Examiner*—Louis Huynh
(74) *Attorney, Agent, or Firm*—Beyer Weaver LLP (57) ABSTRACT

A mixing system includes a portioning device for sequentially supplying batches of a specified quantity of foodstuffs at a supply location. A mixing device includes a number of mixing chambers which can be sequentially aligned with the foodstuff supply location. A dispenser is provided for dispensing measured quantities of an additive at an additive supply location spaced from the foodstuff supply location. The mixing chambers are movable about a closed path so as to be sequentially brought into alignment with the foodstuff supply location and the additive supply location. A control system controls operation of the portion device, mixing device and dispenser. A packaging device is disposed downstream to the supply location and below the mixing device for packaging the batch of foodstuffs in a bag. Each mixing chamber is operable above the packaging device to discharge its contents into the packaging device.

8 Claims, 5 Drawing Sheets

| Item No. | Article Name | Seasoning Type | Weight per Bag (Target Weight) | Ratio of Seasoning | Speed of Operation | Production Schedule |
|---|---|---|---|---|---|---|
| 01 | Potato chips(light salt) | #1 | 100 | 5 % | 100bpm | 10,000 |
| 02 | Barbecue flavor | #2 | 100 | 7 % | 120bpm | 5,000 |
| 11 | Mayonnaise flavor | #5 | 80 | 5 % | 80bpm | 5,000 |
| 21 | --- | --- | --- | --- | --- | --- |
| 33 | --- | --- | --- | --- | --- | --- |

MIXING SYSTEM

This application is a Continuation International (designating the United States) Application No. PCT/GB02/02002 filed on May 1, 2002 which claims priority on Japanese Patent Application No. 2001-137010.

BACKGROUND OF THE INVENTION

This invention relates to a mixing system, particularly for use with foodstuffs in which an additive such as flavoring, for example, salt or a spice, or a token or the like is added to the food stuff prior to packaging.

Apparatus for adding flavoring to snack food items such as potato-based or corn-based items have been described, for example, in Japanese Patent Publications Tokko 4-35132 and 2689139 and U.S. Pat. Nos. 5,090,593 and 5,846,324. In these prior are apparatus, items such as potato chips taken out of a frying machine are introduced into a rotary drum and a seasoning material is added at a specified ratio to mix them together. Whenever a different kind of flavoring material is to be used, it is necessary to wash all components downstream of the flavoring apparatus. This typically includes a weighing machine for dividing received items into batches of a specified weight to be made into individual packaged products.

It now goes without saying that washing all these devices on the downstream side is both cumbersome and time-consuming. Moreover, since all these devices must be stopped during such a washing operation, it has a significantly adverse effect on the productivity of the system.

When devices on a production line are to be washed, the one on the upstream side is stopped first but those on the downstream side are allowed to continue operating until the products being processed thereby are all discharged. Since the operator cannot exactly control the number of finally outputted products before the system is completely stopped, there may be left a container which is only incompletely filled with finished products.

Furthermore, the adding of an additive slows down production time, particularly where more than one additive is required.

SUMMARY OF THE INVENTION

In accordance with the present invention, a mixing system comprises a portioning device for sequentially supplying batches of a specified quantity of foodstuff at a supply location; a mixing assembly including a number of mixing chambers which can be sequentially aligned with the foodstuff supply location; a dispenser for dispensing measured quantities of an additive at an additive supply location spaced from the foodstuff supply location, wherein the mixing chambers are movable about a closed path so as to bring them sequentially into alignment with the foodstuff supply location; and a control system for controlling operation of the portioning device, mixing assembly and dispenser.

In accordance with a second aspect of the invention, a method of mixing one or more additives with foodstuffs comprises sequentially supplying batches of a specified quantity of foodstuffs at a supply location to respective mixing chambers; moving the mixing chambers about a closed path from the supply location to one or more additive supply locations; at the or at least one of the additive supply locations dispensing a measured quantity of an additive into the mixing chamber; and dispensing the mixture.

In this specification, by "quantity" we include number, weight, volume or any other measure suitable for the foodstuffs concerned.

In contrast to the prior art, we provide a mixing assembly downstream of the portioning device so that additives are applied to the foodstuffs, rather than during a subsequent cooking step.

In addition, the system overcomes the washing problems mentioned above, particularly where additives such as flavorings are involved. Thus, since the additive is applied after the foodstuffs are portioned into batches of a specified quantity by means of a weighing machine or the like, the additive material being applied does not come into contact with the weighing device and it becomes unnecessary to wash the weighing machine each time a new additive is to be applied. Thus, the system need not be stopped for a washing operation and hence the productivity improves dramatically. Moreover, since the weighing device need not be washed, it need not be detachably structured. Thus, such a system can be provided more inexpensively.

Another important aspect of the invention is the provision of a number of mixing chambers which can be sequentially aligned with the foodstuff supply location. The advantage of this is that an additive can be dispensed to a mixing chamber at the same time as another mixing chamber is being filled with a subsequent batch of the foodstuff or is being emptied. Furthermore, the invention allows a mixing process to be undertaken while another mixing chamber is being filled or emptied. The result of this is significant increase in productivity. For example, in the case of tokens or the like, there is time to add a token to the foodstuffs even through tokens tend to fall at a different speed to the foodstuff and, in the past, have often ended up in the seal region of the bag.

The mixing chambers could be mounted on a conveyor or the like but preferably are mounted on a rotary support, the control system being adapted to cause rotation of the support and hence movement of the mixing chambers along the closed path. Typically, the rotary support will have a substantially vertical axis.

In some cases, a single additive dispenser will be provided to which the mixing chambers are sequentially fed but in other cases, more than one additive dispenser could be provided, each associated with a respective additive supply location located along the path of movement of the mixing chambers. However, more than one additive dispenser could be located at the same additive supply location. Further, an additive supply location could be coincident with a foodstuff supply location. These additive dispensers could be used for mixing additives with the same batch of foodstuffs or alternatively could be used on different runs of the system with different foodstuffs, the additives being chosen to correspond to the particular foodstuff being portioned.

The additives may take a variety of forms including flavorings such as salt or spices, flavoring sachets which allow a purchaser to add the flavoring himself/herself as required, or non-food items such as tokens, novelty toys and the like.

Flavorings typically include seasoning such as salt and spices but may also include other particulate, powder or liquid additives that may typically require to be applied reasonably uniformly. Flavorings also include "chemical" flavors commonly referred by "E numbers" such as cheese and onion flavors.

In cases where the additive(s) is (are) a non-food item or a packaged food item, it can simply be dispensed into the mixing chamber from which the mixture is dispensed. However, where the additive comprises a food related item such as flavoring, the method preferably further comprises operating the mixing chambers to mix the additive(s) and foodstuffs following the dispersing step. This may involve shaking the mixing chamber or more conveniently rotating the mixing chamber.

Typically, the mixing chambers are operated substantially continuously to mix the additive(s) and foodstuffs but they could also be operated intermittently.

Typically, the mixing chambers are emptied at a location spaced from the foodstuff supply location. The advantage of this is that a mixing chamber can be emptied at the same time as another mixing chamber is being filled with a batch of foodstuffs. In some embodiments, however, each mixing chamber is emptied when positioned at the foodstuff supply location since this reduces space requirements.

The invention allows a change in the kind of additive to be effected quickly, or even automatically.

The invention enables the additive to be changed instantly such that products with different additive or combinations of additive can be produced on a single production line.

The system is inexpensive and durable.

The foodstuffs are typically snack food products such as potato chips but could include other foodstuffs such as cereals, nuts, biscuits, confectionery, etc.

The foodstuffs are typically unseasoned and unflavored prior to the portioning but could already be partly seasoned.

The portioning device is typically a weigher but could also portion by number, volume or even by type of item.

BRIEF DESCRIPTION OF THE DRAWINGS

Some examples of systems and methods according to the present invention will now be described with reference to the accompanying drawing, in which.

DETAILED DESCRIPTION OF THE INVENTION

Figure 1:
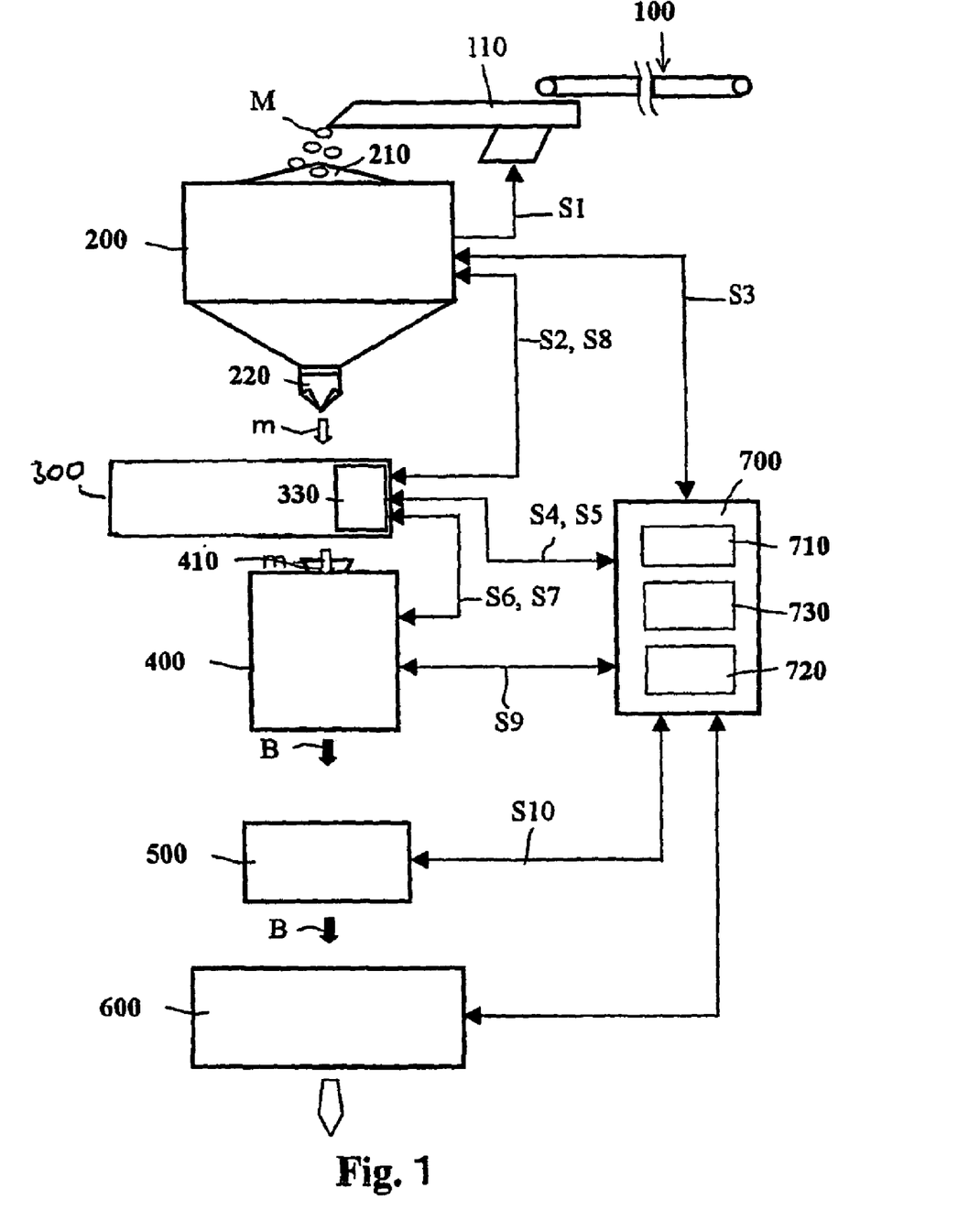
FIG. 1 is a schematic block diagram for showing the basic structure of a mixing system embodying this invention.

The invention is described next by way of an example. FIG. 1 shows the basic structure of a mixing system embodying this invention including a transporting device 100 for transporting unseasoned or unflavored food items, a weighing device 200 for portioning or partitioning the food items transported by the transporting device 100 into batches of a specified quantity for filling one bag, a mixing device 300 for applying additives such as flavorings to each batch of the food items, a packaging device 400 for packaging the flavored or seasoned food items, a sorting device 500 for eliminating from the production line defective products caused by an error in weighing or application of flavoring, a packing device 600 for packing packaged products in a box, and a control unit 700 for not only controlling each of the devices 100, 200, 300, 400, 500 and 600 but also coordinating their operations.

The transporting device 100 is for receiving food items from a frying machine (not shown) and transporting them to the weighing device 200. A vibrating feeder 110 is provided at its downstream end for supporting thereon the transported food items. When a supply-requesting signal S1 is received from the weighing device 200, the vibrating feeder 110 vibrates for a specified length of time to deliver the food items thereon to the weighing device 200.

The weighing device 200 is for receiving the food items delivered by the vibrating feeder 110 and producing batches of the food items each for filling one bag as a finished product. It has a dispersion feeder 210 at the top, and when the amount of the food items thereon becomes too small, it transmits the aforementioned supply-requesting signal S1 to the vibration feeder 110.

When a discharge-requesting signal S2 is received from the mixing device 300, the weighing device 200 opens a gate 223 of its timing hopper 220 to discharge a batch of the food items m of a specified amount which have been held therein. Thereafter, the weighing device 200 starts its weighing operations to portion another batch with a specified quantity or weight and discharges this new batch into the timing hopper 220 which has just been emptied and is waiting for the next discharge-requesting signal S2.

The purpose of this weighing device 220 is to portion the food items and to discharge these portioned batches. The portioning need not be in terms of weight but may be in terms of volume or number. In the case of a snack food of the type having individually different sizes, it is convenient to use a combinational weigher such as described in U.S. Pat. No. 5,757,866 issued May 19, 1998, adapted to use a dispersion feeder 210 to distribute food items supplied at the top center among a plurality of weigh hoppers, to measure the individual weights of the items in these weigh hoppers, and to select a combination of the weigh hoppers such that the total of the weights of the items in the selected combination of the weigh hoppers will be of a specified magnitude. With a weigher of this type, even irregularly shaped items can be portioned accurately.

If an error is committed in the weighing, the weighing device 200 transmits an error signal S3 to the control unit 700. Upon receiving an error signal S3, the control unit 700 transmits a stop signal S4 to the mixing device 300 to stop dispensing additive(s) to the error batch. Thus, if a batch with an incorrect quantity is discharged, this batch is not flavored and may be collected to be used for producing a differently flavored product or be recycled for use with the same flavor.

Figure 3:
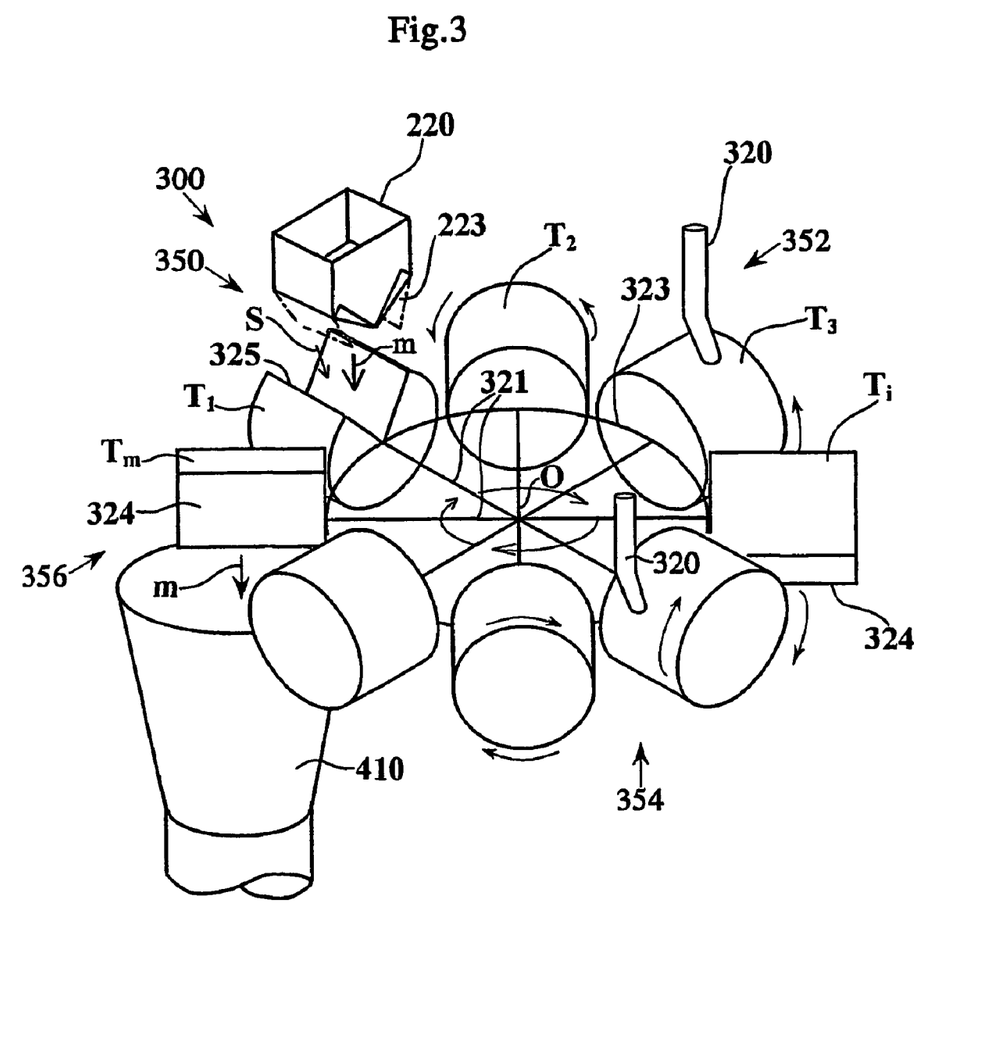
FIG. 3 is a schematic perspective view of the mixing assembly shown in FIG. 1.
Figure 4A:
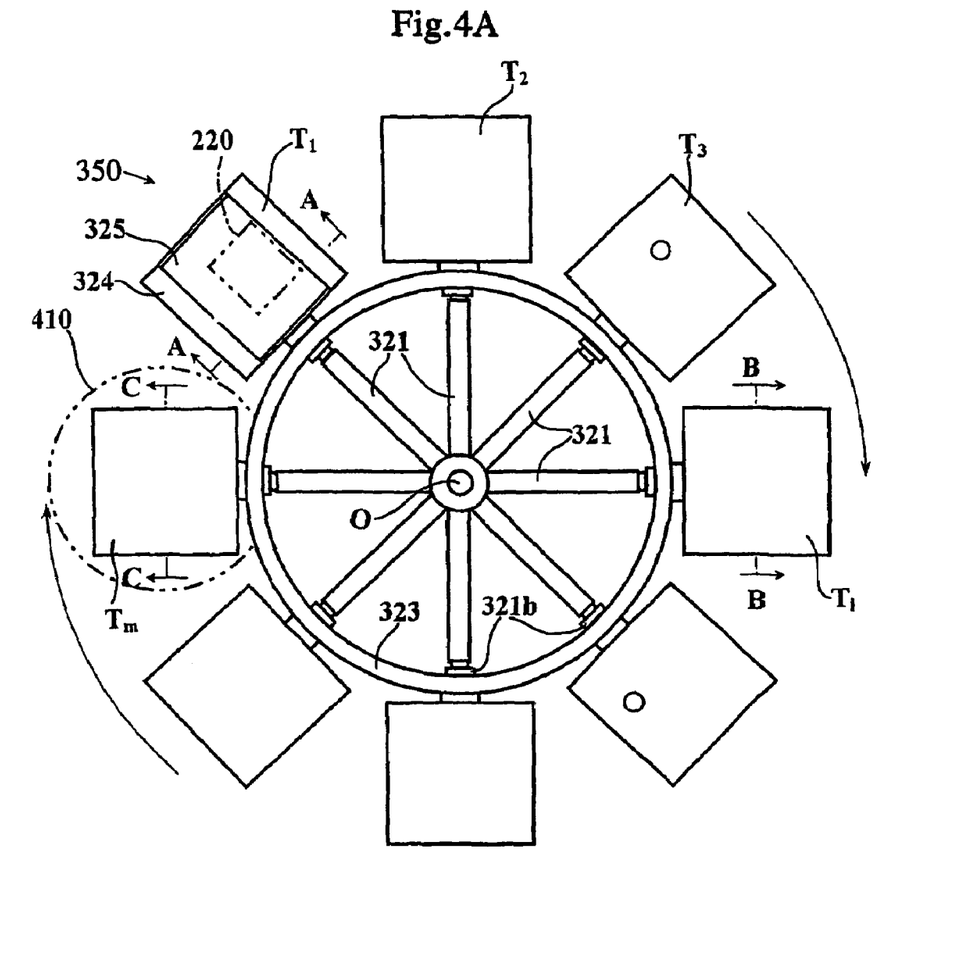
FIG. 4A is a plan view of the mixing assembly and FIG. 4B is a side view of a portion of a mechanism for rotating the drum.
Figure 4B:
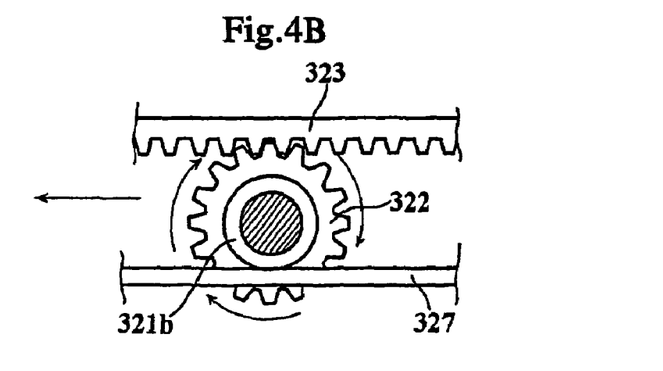

FIG. 3 shows an example of the mixing device 300, structured such that a plurality of small mixing drums or chambers $T_1$-$T_m$ will rotate along a closed path around a vertical axis of rotation O and pass beneath the timing hopper 220 at a supply location 350 to a pair of additive supply locations 352, 354 at each of which a respective additive can be dispensed and to a discharge location 356. During this movement, each drum rotates around itself. Explained more in detail with reference to FIG. 4A, the drums $T_1$-$T_m$ are attached to the tips of arms 321 extending radially from the axis of rotation O such that as the central rotary shaft along the axis of rotation is rotated, the drums $T_1$-$T_m$ rotate horizontally together with the arms 321, as indicated by arcuate arrows. Each arm 321 carries on its end distal from the axis of rotation O a rotary member 321b adapted to rotate around its direction of extension. As shown in FIG. 4B, the rotary member 321b is connected to a fixed annular rack 323 and a pinion 322 and is supported on a frame 327 such that, as the arms 321 rotate horizontally around the axis of rotation O, the pinion 322 engaging with the fixed rack 323 rotates along the rack 323. As a result, the rotary member 321*b* which is integrally formed with the pinion 322, as well as the associated one of the drums $T_1$-$T_m$, will rotate around the axis of rotation of the arm 321. The rack and pinion system is constructed so that the sliding gate 324 of each drum is correctly positioned at each location 350-356.

Figure 5A:
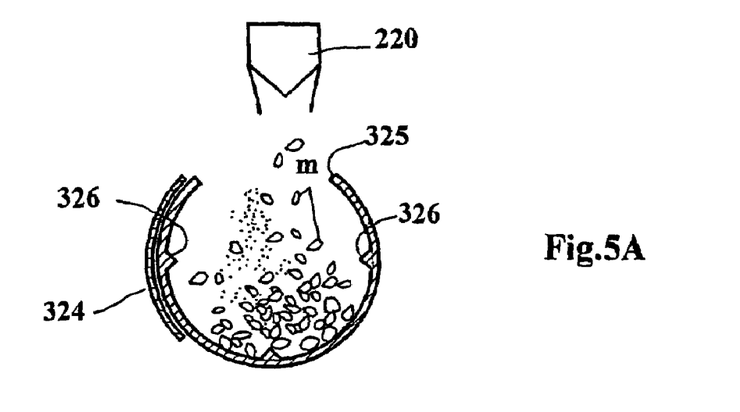
FIGS. 5A, 5B and 5C are schematic sectional views for showing how food items and a flavoring are mixed together.
Figure 5B:
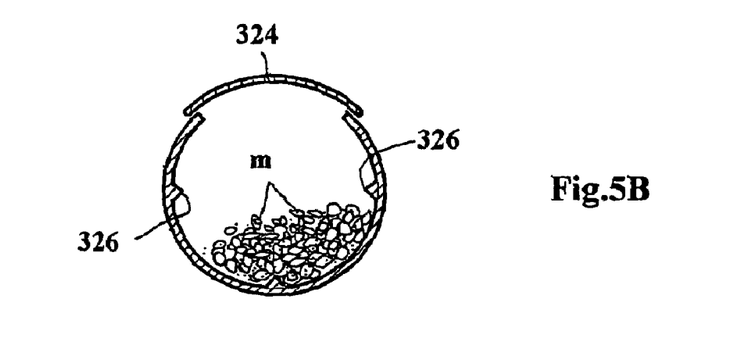
Figure 5C:
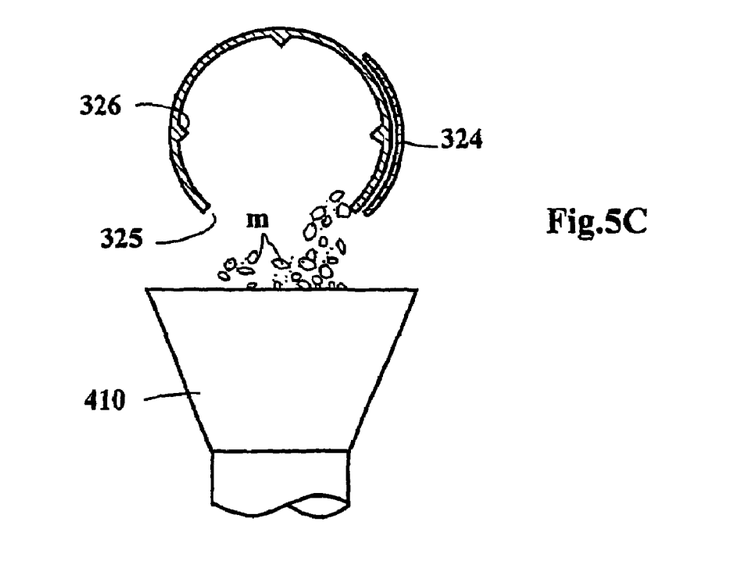

Each of the drums $T_1$-$T_m$ has an opening 325, provided with a sliding gate 324 biased by a spring (not shown) in the direction of closing it. When one of the drums $T_1$-$T_m$ reaches the foodstuff supply position 350 for receiving unseasoned food items (the position of drum $T_1$ in FIG. 3), its opening 325 is at an upwardly facing position, as shown in FIG. 5A, and the sliding gate 324 is opened. At the same time, another of the drums ($T_m$ in the example of FIG. 3) which is at a discharge position 356 has its sliding gate 324 opened with its opening 325 facing in the vertically downward direction, as shown in FIG. 5C. At the positions 352, 354, the drums will have their gates 324 open with the openings 325 facing upward to receive an additive (if appropriate). At other positions, the drums $T_1$-$T_m$ have their sliding gates 324 closed, as shown in FIG. 5B, sealing inside both a batch of food items m and additive(s). The opening/closing process can be controlled by a simple cam system (not shown).

As shown in FIG. 5, for flavoring additives, there are protrusions 326 inside the drums $T_1$-$T_m$ serving to stir and mix the food items and the seasoning material S together as the drums $T_1$-$T_m$ rotate. This results in the food items being uniformly coated with the flavoring.

At each position 352, 354, a respective dispenser 310 is located, each additive dispenser 310 being controlled by a common control device 330.

Each dispenser 310 (FIG. 2) includes a charge hopper 311 for storing the flavoring, tokens or other additive, a vibratory feeder 312 for transporting the additive inside the charge hopper 311 to its front end little by little, a weigh hopper 313 for receiving the additive S from the vibratory feeder 312 and weighing the received additive and a weight sensor 314 for measuring the weight of the weigh hopper 313.

Figure 2:
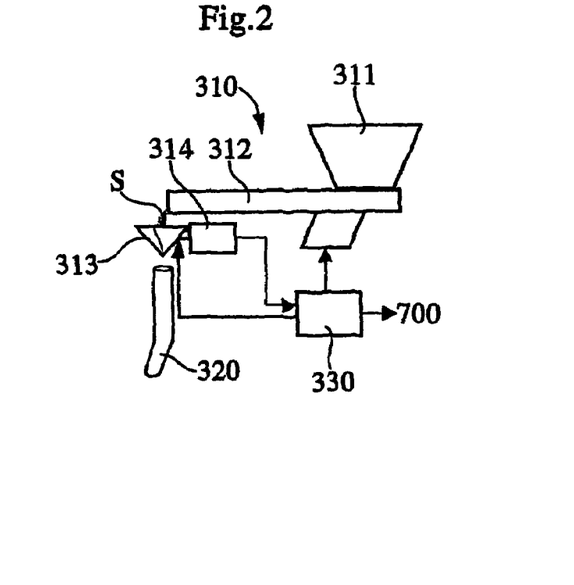
FIG. 2 is a schematic block diagram for showing the basic structure of a flavoring device such as shown in FIG. 1.

The control device 330 drives the feeder 312 while monitoring the value measured by the weight sensor 314. When a specified quantity of the additive has been received by the weigh hopper 313, the feeder 312 is stopped. The weigh hopper is then controlled at the appropriate time to discharge the additive into a supply tube 320 for guiding to a mixing chamber Ti located beneath the tube 320 with its gate 324 open.

If the flow rate of the additive from the charge hopper 311 or the amount of the additive therein is insufficient and the specified quantity of the additive material fails to be received by the weigh hopper 313 within a specified length of time, the control device 330 concludes that an abnormal condition has occurred and outputs a discharge abnormality signal S5 to the control unit 700. Upon receiving the discharge abnormality signal S5, the control unit 700 outputs signals S9 and S10 to the packaging device 400 and the sorting device 500 to eliminate defective products which have not been flavored properly.

The structure of the dispenser 310 depends on the form of the additive. If a liquid flavored is involved, an air spray device may be appropriate. If the additive is in the form of a paste, a screw conveyor capable of controlling the supply according to its angle of rotation may be used. If the additive is in a granular or powder form, a device capable of controlling the supply according to the volume may be preferred.

Although FIG. 2 shows an embodiment whereby an abnormality in the supply rate of the additive is detected by the weight measured by the weigh hopper 313, neither is this intended to limit the scope of the invention. The method of detecting an abnormal situation varies, depending on the mechanism for supplying the additive. If the additive is a liquid, for example, an abnormal condition may be detected by means of a flow rate sensor. Whatever the form of additive, an abnormal supply condition may be detected by means of a weight sensor to monitor the rate of its decrease.

When a discharge requesting signal S6 is outputted from the packaging device 400, the control device 330 stops drum $T_m$ directly above a chute 410 of the packaging device 400 at discharge position 356 with its gate facing down. At the same time, drum $T_1$ stops at a position directly below the timing hopper 220 with its gate 324 facing up. Thereafter, the control device 330 opens the slide gates 324 of these two drums $T_1$ and $T_m$ and outputs a discharge end signal S7 to the packaging device 400 and a discharge requesting signal S2 to the weighing device 200.

As the discharge requesting signal S2 is received, the weighing device 200 opens the timing hopper 220 and transmits a discharge end signal S8 to the control device 330.

Thus, each of the drums $T_1$-$T_m$ is stopped whenever it comes to the position directly above the packaging device 400 and discharges the flavored food items down to the packaging device 400. At the same time, an emptied drum receives a new batch of food items from the timing hopper 220 and a specified amount of additive is added from the dispenser(s) 310 to adjacent drums. Thereafter, the control device 330 rotates the drums $T_1$-$T_m$ such that the food items m and the additives are stirred together.

Examples of the packaging device 400 include those adapted to open a bag and fill items in the opened bag and the so-called vertical pillow type adapted to form an elongated film into a tubular shape while filling it with items, to seal simultaneously the top of the filled bag and the bottom of a next bag to be filled and to cut the film in between. With such a vertical pillow type packaging device, bags which are not sealed or cut can be produced temporarily by changing its mode of operation. Thus, when the control unit has received an error signal S3 from the weighing device 200 or a discharge abnormality signal S5 from the mixing device 300, a mode changing signal S9 may be outputted to the packaging device 400 to change the mode of its operation such that properly produced products and defective products can be easily distinguished from the ways they are packaged.

The aforementioned sorting device 500 is for the purpose of eliminating defective bags B from the production line described above in response to a signal S10 from the control unit 700. If it is disposed on the downstream side of the packaging device 400, as is the case according to the embodiment being described, it may appropriately comprise a sorting conveyor. If it is disposed between the mixing device 300 and the packaging device 400, it may comprise a switching chute adapted to change the direction of discharge in response to a command signal. Thus, although an error may be committed in the flavoring process, defective products can be dependably prevented from being shipped.

The packing device 600 is for packing the completed bags B in cardboard boxes for shipment and also serves to count the number of bags B which have been handled. The counted number is transmitted to the control unit 700 to be used in production management.

Figure 6:
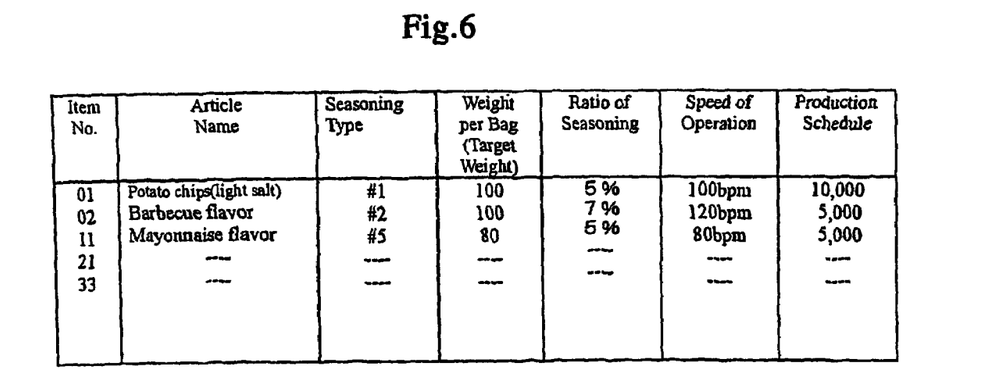
FIG. 6 shows how data may be stored in a memory.

The control unit 700 is for controlling the devices 200, 300, 400, 500 and 600 in proper coordination and includes an input/output device 710 for communicating with these devices to control them individually and a memory 720 for storing production data on products for each kind, for example, as shown in FIG. 6. The memory 720 stores data for each kind of product such as the kind of flavoring material to be applied, the rate of its application, the speed of operation of the packaging device (say, in bpm=bags per minute), the weight of each bag to be produced and the planned number of bags to be produced. If the user operates on the input/output device 710 to input a product (code) number, various data on the corresponding kind of product are retrieved and transmitted to the individual ones of the corresponding devices. For example, the data on the kind and rate of application of the flavoring material are transmitted to the mixing device 300, the speed of operation is transmitted to the packaging device 400 and the weight of each bag is transmitted to the weighing device 200. The planned number of products is set in a microcomputer 730.

When the user operates a start key displayed on the input/output device 710, the control unit 700 starts to control the devices from the upstream side, recording the numbers of processed batches (or bags) individually by the devices 200, 300, 400, 500 and 600. From these data, the microcomputer 730 calculates the number of batches (or bags) yet to be processed. If this value becomes zero for any of these devices, a stop command is delivered to the corresponding device to stop its operations.

In the case of an error where defective products have been produced and eliminated, the deficiency caused thereby is added to the planned number of products for the devices on the upstream side such that a desired number of finished products will be produced. In this manner, a desired planned number of products can be obtained without producing a waste.

Since each additive dispenser 310 is adapted to dispense additive to one batch of food times at a time, it need not be as big as the conventional devices. Thus, a plurality of additive dispensers each for applying a different kind of additive may be provided as shown in FIG. 3.

It is also possible in another application, to produce one bag at a time of differently seasoned food items in a sequential manner such that a series of differently flavored packages can be produced, as could not be done by the prior art technology. For example, one kind of additive may be added to even-numbered drums and another kind may be added to odd-numbered drums. Since none of the these drums is going to be used for different additives, there is no washing problem.

The invention has been described above by way of a system with one production line to carry out weighing, flavoring, packaging and packing but a distributing device such as disclosed in Japanese Patent Publication Tokko 4-35132 may be used if a plurality of such production lines are used on the upstream side of the transporting device 100 for each or the production lines such that food items can be distributed among the production lines uniformly. If each production line is associated with a specified kind of additive in such a system, products of different kinds can be produced simultaneously immediately before they are packaged and items which are left over can be returned and recycled to another production line.

What is claimed is:

1. A mixing system comprising:
    a portioning device for sequentially supplying batches of a specified quantity of foodstuffs at a supply location;
    a mixing device including a number of mixing chambers which can be sequentially aligned with the foodstuff supply location;
    a dispenser for dispensing measured quantities of an additive at an additive supply location spaced from the foodstuff supply location, wherein the mixing chambers are movable about a closed path so as to be brought sequentially into alignment with the foodstuff supply location and the additive supply location;
    a control system for controlling operation of the portioning device, mixing device and dispenser;
    a packaging device downstream to the supply location and below the mixing device for packaging said batch of foodstuffs in a bag, each mixing chamber being operable above the packaging device to discharge contents thereof into the packaging device; and
    one or more additional additive dispensers, each associated with a respective additive supply location located along the path of movement of the mixing chambers;
    wherein the mixing chambers are mounted on a rotary support, the control system being adapted to cause rotation of the support and hence movement of the mixing chambers along the closed path and each mixing chamber is rotatably mounted about a substantially horizontal axis.

2. The system of claim 1, wherein said portioning device comprises a weigh device which serves to supply foodstuffs to a plurality of weigh hoppers, to measure individual weights of items in said weigh hoppers, to select a combination of said weigh hoppers with a specified weight on the basis of the measured weights and to thereby supply one of said batches.

3. The system of claim 1 further comprising:
    a sensor for monitoring discharge of additive by the dispenser; and
    a sorting device for discarding a packaged product packaged by said packaging device if said sensor detects an abnormality in said discharge of said additive.

4. The system of claim 1 wherein said packaging device is a vertical pillow packaging machine which serves to form an elongated film into a tubular form to produce a bag while filling said bag with said batch of foodstuffs, to seal said film between said bag and another bag being subsequently formed, and to cut said film to separate said bag from said another bag.

5. A mixing system comprising:
    a portioning device for sequentially supplying batches of a specified quantity of foodstuffs at a supply location;
    a mixing device including a number of mixing chambers which serve to mix foodstuffs therein together and can be sequentially aligned with the foodstuff supply location;
    a dispenser for dispensing measured quantities of an additive at an additive supply location spaced from the foodstuff supply location, wherein the mixing chambers are movable about a closed path so as to be brought sequentially into alignment with the foodstuff supply location and the additive supply location;
    a control system for controlling operation of the portioning device, mixing device and dispenser;
    a packaging device downstream to the supply location and below the mixing device for packaging said batch of foodstuffs in a bag, each mixing chamber being operable above the packaging device to discharge contents thereof into the packaging device; and
    one or more additional additive dispensers, each associated with a respective additive supply location located along the path of movement of the mixing chambers;
    wherein the mixing chambers are mounted on a rotary support, the control system being adapted to cause rotation of the support and hence movement of the mixing chambers along the closed path and each mixing chamber is rotatably mounted about a substantially horizontal axis.

6. The system of claim 5, wherein said portioning device comprises a weigh device which serves to supply foodstuffs to a plurality of weigh hoppers, to measure individual weights of items in said weigh hoppers, to select a combination of said weigh hoppers with a specified weight on the basis of the measured weights and to thereby supply one of said batches.

7. The system of claim 5, further comprising:
a sensor for monitoring discharge of additive by the dispenser; and
a sorting device for discarding a packaged product packaged by said packaging device if said sensor detects an abnormality in said discharge of said additive.

8. The system of claim 5 wherein said packaging device is a vertical pillow packaging machine which serves to form an elongated film into a tubular form to produce a bag while filling said bag with said batch of foodstuffs, to seal said film between said bag and another bag being subsequently formed, and to cut said film to separate said bag from said another bag.

* * * * *